Patented May 1, 1928.

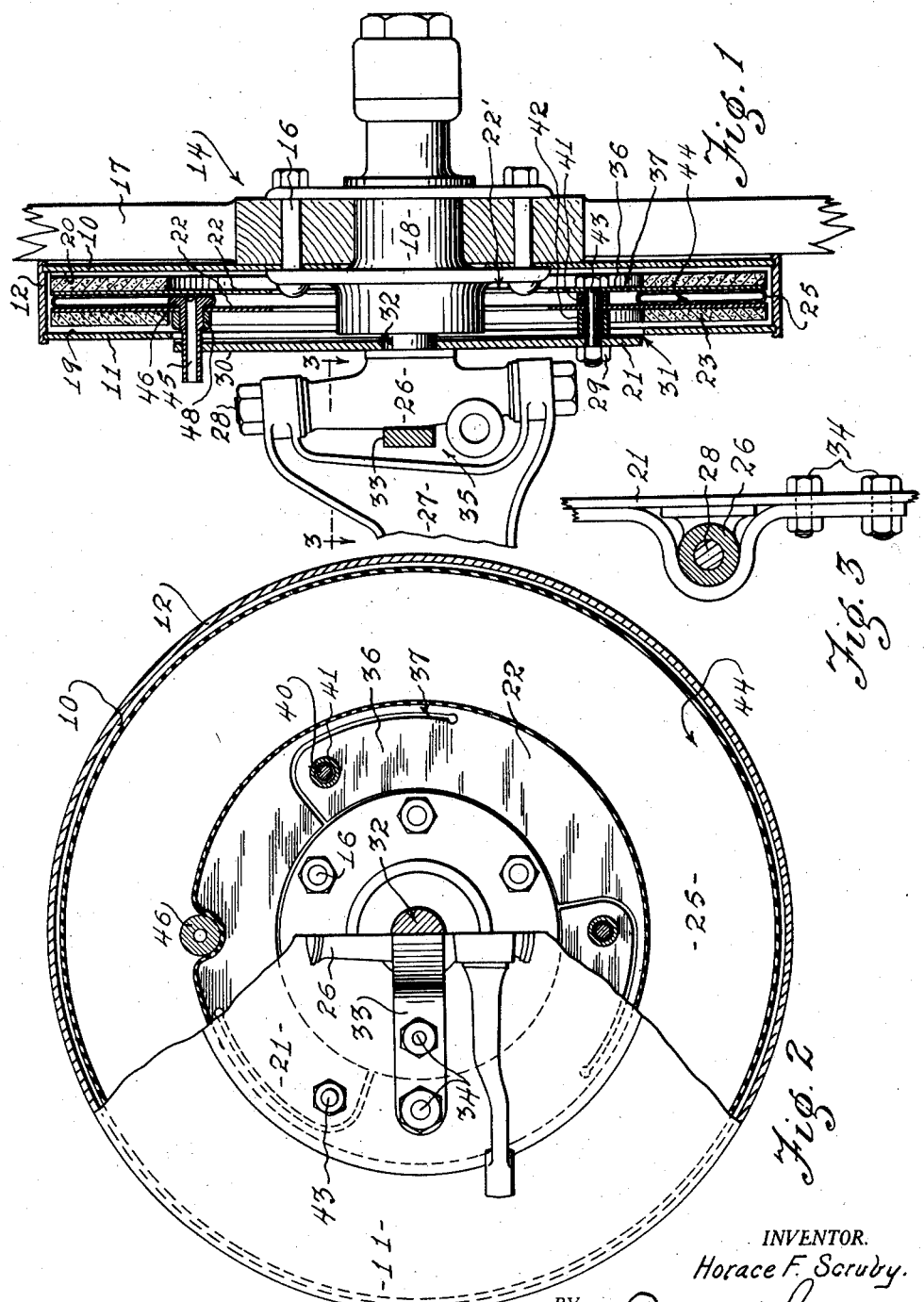

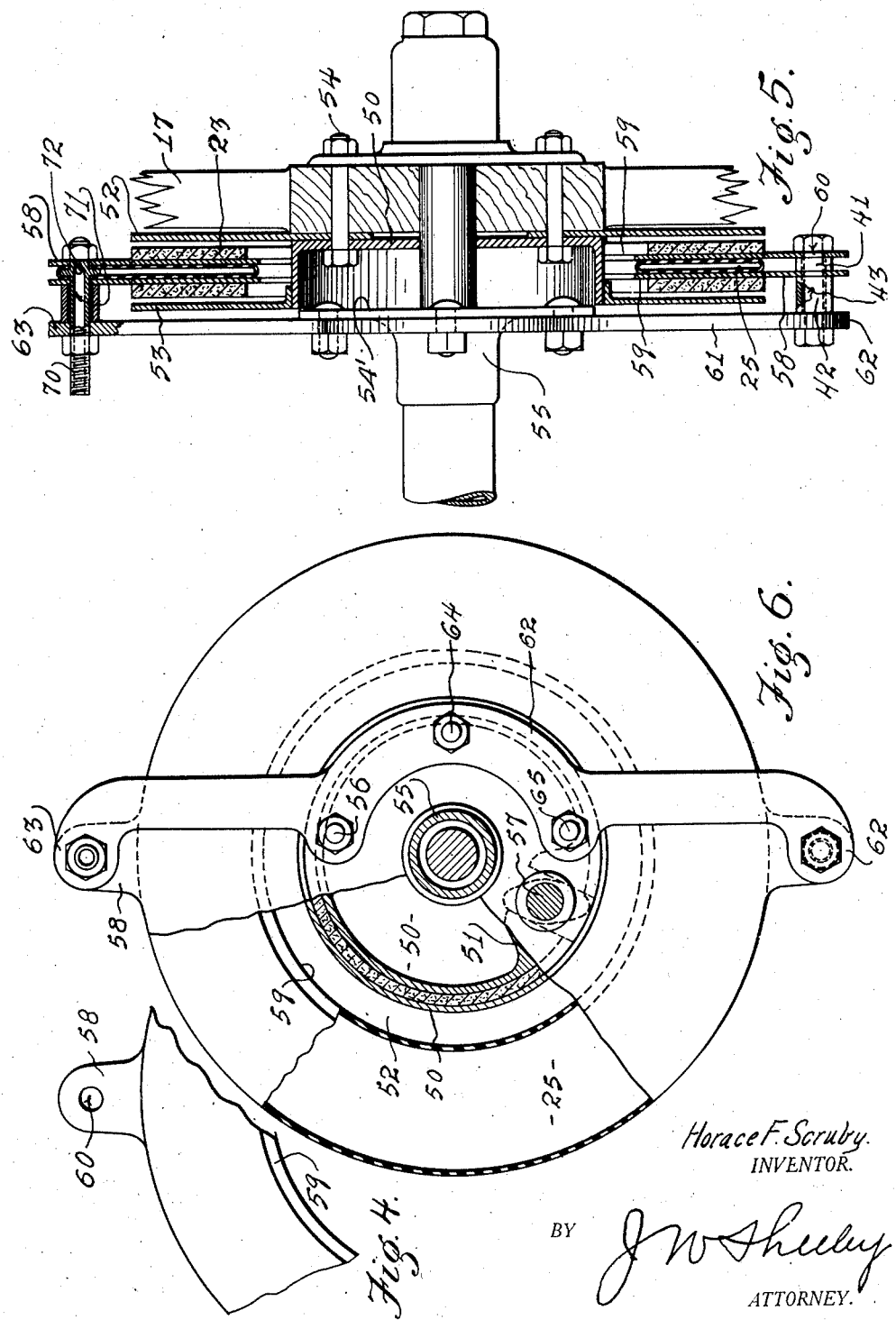

1,668,027

UNITED STATES PATENT OFFICE.

HORACE F. SCRUBY, OF LOS ANGELES, CALIFORNIA.

FLUID BRAKE AND THE LIKE.

Application filed March 2, 1925. Serial No. 12,791.

My invention relates to starting and stopping mechanisms of the class to which brakes and clutches belong, and pertains more particularly to pneumatic automobile brakes of the type in which an inflator acts directly against a friction member to force it into frictional contact with the revolving brake drum.

The invention has for its principal object the provision of a brake of the character described in which comparatively great braking areas may be had so that low and practical air pressure may be employed.

In my co-pending application Serial No. 731,473, I have set forth methods and means for providing large quantities of low pressure air for operating air brakes on automotive vehicles, and it is another object of this invention to provide an improved construction and arrangement of inflator and friction plates whereby such low pressure may be very effectively used.

Another object of the invention is to eliminate packed joints, plungers, piston rings and all other constructions in which an air tight joint must be provided between two relatively moving parts.

Another and important object of the invention is to provide a pneumatic brake for automobiles in which the friction surfaces are disposed in a plane paralleling the plane of the wheel, whereby more than one set of coacting braking surfaces may be employed, without resorting to the use of levers and air tight connections between moving parts.

My invention contemplates the use of a revolving drum, relatively fixed friction plates, and an inflator between the two plates for forcing the plates away from each other into frictional engagement with corresponding sides of the brake drum. It is, therefore, another and important object of the invention to provide improved torque receiving means for suitably holding the friction plate in normal position.

In multiple disk clutches and brakes of the pneumatic inflator type, previously invented and used by me, a torque plate is provided with laterally protruding pins.
The friction plates are mounted to slide laterally on said pins. Provision is made for causing air to force the plates away from each other to engage the drum, while springs are arranged to return the plates to normal position as soon as the pressure is relieved. It is another object of the invention to eliminate the spring and pin arrangement and to provide for mounting and controlling the plates in a simpler manner and by less elaborate means while reducing or precluding any tendency for uneven application and irregular wearing of the friction material.

Another object of the invention is to provide an improved construction and mounting for the friction plates whereby the portions of the plate may move away from corresponding portions of an adjacent plate while both such plates are in themselves held fixed. Heretofore a similar result has been obtained only by shaping the friction plate so that it acts like a diaphragm. The diaphragm construction is objectionable in that the plate is weakened circumferentially and is not adapted to withstand the excessive torque which is peculiar to automobile brakes, and certain conditions under which clutches and couplings are used.

Another object of the invention is to provide an improved construction for rear wheel brakes so that pneumatic service brakes may be applied to rear wheels of a vehicle without dispensing with the usual internally expanding emergency brake.

Still other objects and advantages of my invention will appear hereinafter, and will be better understood by virtue of the order of their occurrence.

I have illustrated by the accompanying drawings a preferred embodiment of my invention and a modification thereof, and I have also illustrated the application of the preferred embodiment to both front and rear wheels.

In the said drawings,

Figure 1 is a view in vertical section of a front wheel of a vehicle with the preferred embodiment of my invention;

Figure 2 is a view partially in elevation of the brake which is shown applied to the wheel in Fig. 1; said view being seen from the inner side of the wheel and showing portions of the brake broken away to reveal underlying portions;

Figure 3 is a fragmentary view in section as seen on a line 3—3 of Figure 1;

Figure 4 is a fragmentary view in elevation of a part hereinafter known as a friction plate;

Figure 5 is a view in vertical section of the preferred embodiment of my invention altered slightly and applied to a rear wheel;

Figure 6 is a view in elevation thereof, as seen from the innermost side of the wheel; showing parts broken away to reveal underlying parts.

Referring to the accompanying drawings, it will be seen that most of the salient features of my invention are common to both the front wheel brake and the rear wheel brake, and I will first describe such features of my invention and subsequently explain the respective features which make the invention adaptable to front wheels and rear wheels respectively.

In carrying out my invention in the preferred construction, I provide two spaced plates 10 and 11 held to each other by an annular wall or band 12 to provide a complete shallow brake drum. Plate 10 is held to the wheel 14 by the same bolts 16 which ordinarily serve only to hold the spokes 17 in assembly with the wheel hub 18. Plates 10 and 11, therefore, revolve with the wheels and the respective surfaces 19 and 20 thereof provide the braking surfaces of the brake drum. As is well known, a brake drum of this type provides a comparatively great area of braking surface in proportion to the diameter and depth of the drum.

In conformity with a salient feature of my invention, I provide, in the embodiments now being described, a member 21 which is arranged to be revolubly independent of the brake drum. Said member is hereinafter known as the torque plate. The term "revolubly independent" is used to signify that the brake drum may revolve without interference with or from the torque plate; in case the parts were reversed, the torque plate could revolve independently of the brake drum. Clutches and brakes are analogous devices, and in carrying out my invention in the form of a clutch the brake drum would be the usual clutch drum and the torque plate would be the equivalent of, or would be fixed to revolve with, the usual clutch disk or disks.

Within the drum there are provided a pair of friction plates 22, 22. The plates are similar to each other although the plates used in the front wheel brake differ somewhat from those in the rear wheel brake, as will appear hereinafter. In all cases, however, said plates are provided with a large central aperture 22' so that they are clear of the wheel hub and may remain motionless in the drum while the drum revolves around them. Each plate carries a friction annulus 23 which may be a ring of cork or other suitable material. I have not shown any metallic fastening means for securing the cork to the friction plates, as none are required. Ordinarily, because of assured friction on each side of the ring, the cork may be secured to the plate solely by shellac or the like.

Another salient feature of the invention is the provision between the plates of an air bag or inflator 25, but before describing the bag further it will expedite the description to first describe the front wheel brake specifically and subsequently the rear wheel brake.

Referring, then, to Figures 1, 2 and 3 particularly, 26 indicates the usual slightly inclined steering spindle bearing member by which the front wheel of a vehicle is oscillatably mounted in the usual axle fork 27 with the king pin 28. It will be apparent now that except for nuts such as 29 no member projects beyond the outer face 30 of the torque plate to interfere with the usual extreme steering positions of the front wheel.

The torque plate shown in Figures 1 and 2 is of full circular form and fills the opening 31 provided in the plate 11. Said torque plate is provided with a central aperture 32 whereby it may be passed over the spindle, and the plate is held fixed to the spindle member 26 by a U-shaped strap 33. Said strap is fixed to the torque plate, as at 34, and the strap passes through the space 35 between the axle fork and member 26 and closely embraces the latter through about 180° of a circle.

The friction plates used on the front wheel brake are each nothing more or less than a disk of sheet metal with a hole in it, except for integral but only partially connected portions 36. By cutting a suitable slot 37, each finger is given its shape and peculiar characteristics, while still being joined to the original blank of metal.

It will be apparent now that each finger is independent of the remainder of the disk in so far as bending is concerned, and said fingers may be yieldably bent outward from the disk a slight distance without distorting the disk proper to any appreciable degree. It will also be apparent now that if the fingers were secured to fixed members the disk could move outwardly or inwardly transversely of the drum and the fingers would yieldably return the disk to normal position.

Each of the integral fingers of the friction plate is provided with an aperture 40. Spacers 41 are provided to hold the friction plates of a pair spaced from each other. Other spacers 42 are used at one side of one plate to hold the same spaced from the torque plate. Bolts 43 are passed through a corresponding finger aperture and through the spacers and torque plate. By tightening the nuts on these bolts the two friction plates and the torque plate are held in a complete assembly which because of the strap is fixed immovably relative to the steering spindle.

It will be seen now that while both plates of a pair are fixed to and carried by the torque plate, in so far as rotation is concerned, the said plates may be moved away from each other so that one plate engages the innermost braking surface of the drum while the other plate may move toward the torque plate until the cork ring which it carries will frictionally engage the other braking surface of the drum. In other words, assuming relative rotary movement between the torque plate and the brake drum one may be caused to frictionally retard or engage the other by merely forcing the disks apart.

In the intermediate space provided between the two friction plates the air bag is placed. Said air bag, or inflator, is best described as being a flattened hollow annulus having a single annular disk-like internal cavity 44. Obviously by admitting even slightly compressed air to the interior of the inflator, the disks will move to bring the cork rings into frictional contact with the brake surface and slight air pressure will exert very great net pressure because of the large effective area of internal surfaces of the inflator. Air is admitted to the cavity through a nipple 45 having an annular enlargement 46 disposed internally of the bag. The nipple is externally threaded as at 47 and a nut 48 screws over the threaded portion. An intermediate portion of the rubberized fabric of the inflator is pinched between the enlargement 46 and the nut 48, and thereby the nipple is securely held to the inflator. Said nipple also passes through one of the frictional plates, so that the inflator and nipple are both actually supported by the torque plate through the medium of one friction plate. The inflator upon being freed from between the friction plates would have a very slight tendency to assume slightly greater thickness, and the slight compression which it is under, together with the support afforded by the nipple, will suffice to hold it against dislodgment or change.

When the inflator is inflated and the friction plates are frictionally connected with the brake drum, the torque is imparted through the friction plates and their fingers to the torque plate and thence to the axle. It will be noted that the fingers are to all practical purposes so shaped and disposed that the major axis of each finger is circumferential and its free apertured end is so disposed that the finger may be said to be circumferential with regard to the center of rotation of the brake drum. Each finger also extends, from where it is connected, in the general direction of rotation. The forces which would be transmitted through the fingers would practically resolve themselves into a single force only acting to stretch the finger along its true major axis.

Referring now particularly to Figures 4 to 6, inclusive, the rear wheel brake differs from the front wheel brake in that it is designed to encompass and avoid the emergency brake housing 50 common to motor vehicles. Thereby my improved rear wheel brake may be applied and used as the service brake without dispensing with the usual emergency brake and without interfering with its operation. The internally contained brake shoes of the emergency brake are indicated at 51.

The rear wheel brake drum is made solely of two plates 52 and 53 connected together by bolts 54, while the drum or housing 50 of the usual emergency brake acts as a spacer for said plates. Said plates, therefore, revolve with the wheel and the emergency brake drum as a unit. The usual emergency brake assembly includes a fixed torque flange 54' which is in effect a part of the rear axle housing 55. Said flange, as is well known, bears the pivot pin 56 for the brake shoes as well as the brake cam shaft 57.

In the rear wheel brake illustrated, the friction plates 59 are each provided with a pair of radially projecting fingers 58 which are an integral part of the plate and are directly opposed to each other. The fingers are each provided with an aperture 60 and by means of the spacers and bolts similar to those used in the front wheel brake, the friction plates are held in correct position within the drum. The inflator is the same as in the said front wheel brakes and acts upon the plate in the same manner. In this case, however, the fingers bend in a different manner, but otherwise they receive the torque. To secure the fingers with regard to the rear axle housing a torque arm 61 is provided with ends 62 and 63, each connecting with the corresponding bolt holding the friction plates. Said torque arm is of semi-circular form and is bolted to the rear axle torque flange as at 64 and 65.

It will be apparent now that I have provided a sensitive, simple and large area brake well adapted to be actuated by any source of low pressure air, and in which integral fingers serve the dual purpose of transmitting the torque and holding the friction plates yieldably in inoperative position spaced from the braking surfaces of the brake drum. By so doing, springs, pins, sliding of metal surfaces and other objectionable features of construction in brakes are dispensed with.

It will be apparent now that I have provided improvements in starting and stopping mechanisms that tend to increase their sensitiveness and efficiency while eliminating pins, springs, sliding bearings and the like, and in which mechanisms the friction plates are not weakened as in the case of circumferentially grooved metal diaphragms, and it will also be apparent that I may employ far heavier metal and allow for a greater degree of movement than is practically possible in diaphragm types of friction plates. While I have shown and described specific embodiments of my invention, and while I have illustrated and described specific applications for the devices illustrated, I do not limit myself to any specific construction or arrangement of parts or to any specific application, and I may alter the construction as I desire or as occasion requires without enlarging the scope of my invention, and I may employ the devices illustrated and claimed for any purpose for which they are suited without enlarging the scope of my invention, within the appended claims.

I claim:

1. In a device of the class described, a torque plate, and a friction plate in spaced parallel relation to said torque plate; said friction plate provided with slots partially separating finger-like portions thereof from the main portion thereof and said friction plate secured to said torque plate by interconnection of said fingers to said torque plate whereby said friction plate is nonrevoluble relative to said torque plate while capable of limited lateral movement relative to said torque plate.

2. In a device of the class described, a torque plate, and a friction plate in spaced parallel relation to said torque plate; said friction plate provided with slots partially separating finger-like portions thereof from the main portion thereof and said friction plate secured to said torque plate by interconnection of said fingers to said torque plate whereby said friction plate is nonrevoluble relative to said torque plate while capable of limited lateral movement relative to said torque plate, and an inflatable element between said friction plate and said torque plate.

3. A friction plate for devices of the class described consisting of a metal blank provided with a relatively large central aperture and slots extending from the circumference of said aperture inwardly of the blank and thence extending in a plane normal to the circumference of said aperture to provide a plurality of spring fingers for the purpose set forth.

4. A friction plate for devices of the class described consisting of a metal blank provided with a relatively large central aperture and slots extending from the circumference of said aperture inwardly of the blank and thence extending in a plane normal to the circumference of said aperture to provide a plurality of spring fingers for the purpose set forth, and a friction element secured contiguously to said plate.

5. In a device of the class described, a drum, a fixed torque plate, a substantially inflexible disc having slots cut therein to provide integral spring fingers, means connecting said disc to said torque means through said fingers only, and an inflator behind said disc and resisted by said torque plate so that upon inflation it will act to move said plate into contiguity with said drum.

HORACE F. SCRUBY.